March 11, 1952  G. WIXSON  2,588,681
GRAVITY DRIVE
Filed Feb. 26, 1951
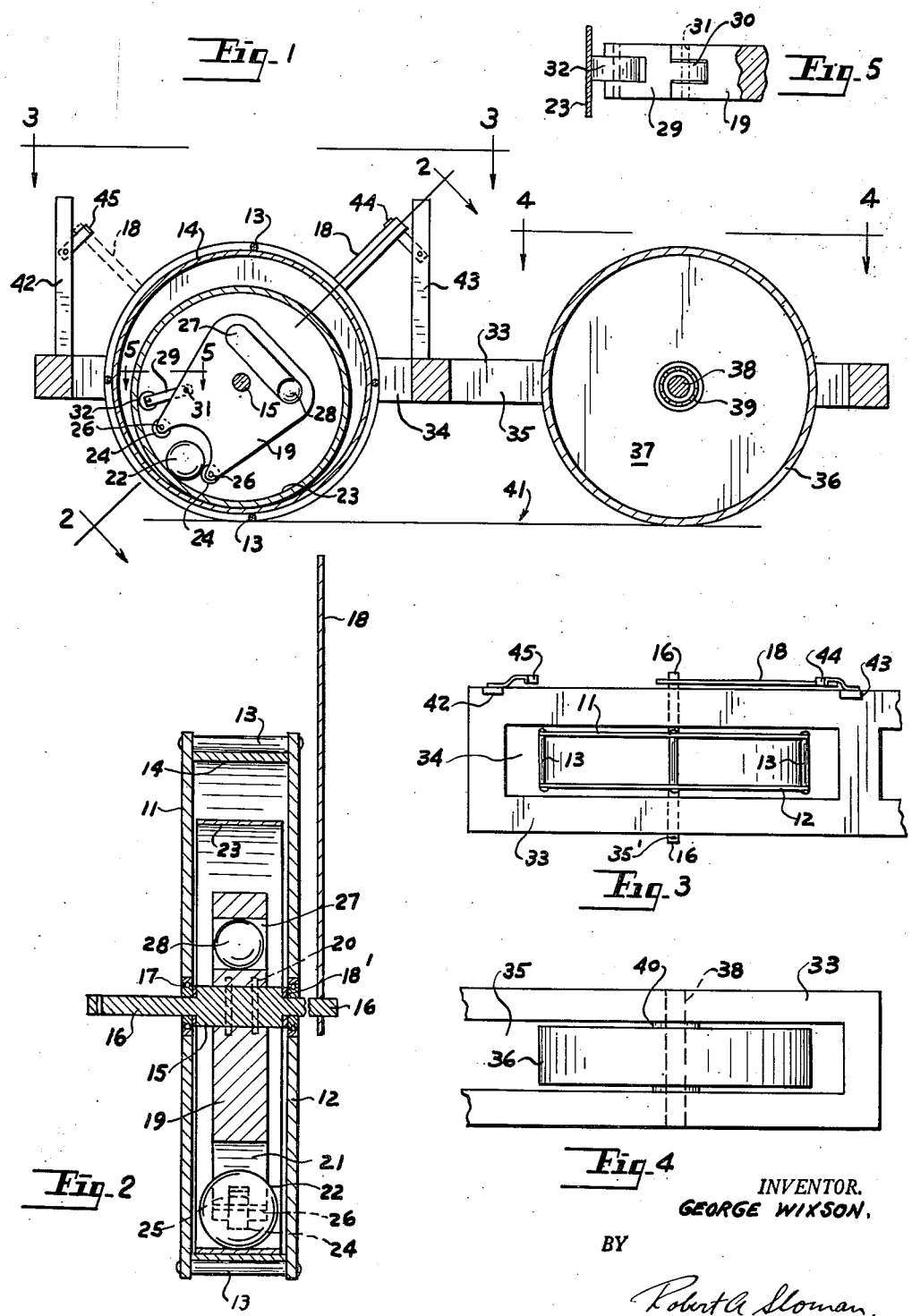
INVENTOR.
GEORGE WIXSON.
BY
Robert A. Sloman.
ATTORNEY.

Patented Mar. 11, 1952

2,588,681

UNITED STATES PATENT OFFICE 2,588,681

GRAVITY DRIVE

George Wixson, Garden City, Mich.

Application February 26, 1951, Serial No. 212,724

7 Claims. (Cl. 280—217)

This invention relates to a gravity drive mechanism, and more particularly to a wheel construction having a relatively stationary axle together with a weight lifting device on said axle whereby a spherical weight may be elevated and projected forwardly of said axle and when maintained in said elevated position the vertical component of said weight is adapted to exert a downward force upon a portion of the wheel in advance of said axle which is elevated above the ground surface causing said wheel to roll forwardly.

It is the object of the present invention to provide a simplified gravity drive mechanism which requires the application of external energy for elevating a sperical weight within said wheel and supporting the same so that rotary motion or rolling motion of said wheel on a surface may be obtained.

This and other objects will be seen from the following specification and claims in conjunction with the appended drawing in which:

Fig. 1 is a transverse vertical cross section of the present gravity drive mechanism shown as a vehicle.

Fig. 2 is a section on line 2—2 of Fig. 1.

Fig. 3 is a section taken on line 3—3 of Fig. 1.

Fig. 4 is a section on line 4—4 of Fig. 1; and

Fig. 5 is a fragmentary section on line 5—5 of Fig. 1.

It will be understood that the above drawing illustrates merely a preferred embodiment of the invention and that other embodiments are contemplated within the scope of the claims hereafter set out.

Referring to the drawing present the gravity drive mechanism includes a hollow wheel consisting of a pair of upright parallel spaced circular discs 11 and 12 which are interconnected peripherally at spaced points by the spacers 13. Said wheel has an outer annular coaxial surface element 14.

Said wheel is rotatably journalled upon the transverse axle 15. Said axle is initially rockable under the control of arm 18 for elevating the sphere 22 to the position shown in Fig. 1.

The body of axle 15 is interposed within wheel discs 11 and 12, there being suitable spacers 18' provided between the body of axle 15 and the interior walls of the wheel discs 11 and 12. Said axle has oppositely arranged extensions 16 of reduced diameter which project through the bearings 17 carried centrally within discs 11 and 12 whereby the hollow wheel is adapted for rotary motion relative to substantially stationary axle 15.

The lever 18 is joined to one of the extensions 16 of said axle and is thus adapted to rock or rotate the axle 15 manually as desired for the purpose hereafter explained.

Control arm 19 is positioned within wheel discs 11—12 and is secured upon the axle 15 by the pins 20. The control arm 19 projects downwardly from axle 15 and has a bifurcated portion at its lower end defining a semi-circular slot 21 within which is loosely and retainingly positioned the spherical weight 22.

The hoop 23 is positioned within the hollow wheel between discs 11 and 12 with its central axis eccentric to and below axis of said wheel discs, and the spherical weight 22 is adapted to bear upon the interior surface of said hoop. The outer ends of the control arm 19 are transversely slotted and have positioned therein the rollers 24 which are journaled thereon as at 26 and are adapted for alternate engagement with the surface of the weight 22 depending upon the positioning of said control arm to minimize friction therebetween.

Elongated slot 27 is formed within control arm 19 and is arranged transversely of the longitudinal axis of said control arm. Spherical counter-balancing weight 28 is movably and retainingly positioned within the slot 27 and has a counter-balancing effect upon said control arm acting in a clockwise direction whereas the weight 22 has a tendency to move in a counter-clockwise direction.

It will be noted that the hoop 23 is loosely positioned within the wheel 11—12 and is adapted for a rotary movement therein loosely with respect to the wheel in a manner hereafter to be described.

Pressure lever 29 is positioned within a slot 30 formed in the control arm 19 and is pivotally joined thereto by the pin 31 which extends through said control arm. The roller 32 is journalled upon the outer end of the forwardly extending lever 29 and is adapted to cooperatively engage the interior surface of the hoop 23. A pivotal movement of control arm 19 under the action of lever 18 would thus lift the weight 22 from a central lowermost position at the bottom of the hoop 23 to the position shown in Fig. 1 and at the same time the roller 32 would bear against the hoop 23 causing the same to be rolled forwardly supported upon the interior surface of annular surface member 14.

In the operative embodiment employed to utilize the present gravity drive mechanism there is provided a hollow frame 33 with a central elongated slot 34 within which is positioned the wheel 11—12 with the respective extensions 16 of axle 15 extending through the side walls of said frame in the manner illustrated in Fig. 3.

A suitable pin 35' extends transversely through one end of axle extension 16 for retaining the same with respect to frame 33. The lever 18 which is joined to the axle extension 16 is arranged on the opposite side of frame 33 as shown in Fig. 3.

The hollow frame also has the rearwardly arranged central slot 35 within which is positioned the supporting roller 36 with side walls 37 of disc shape and journalled upon the transverse axle 38 which extends through the frame 33, there being suitable bearings 39 interposed between the roller 36—27 and said axle. The spacers 40 are of disc shape and are interposed between said frame and the outer surfaces of the roller 36 as illustrated in Fig. 4.

As shown in Fig. 1 the gravity drive wheel and the roller 36 are adapted for rolling movement in one direction or the other upon the flat surface designated at 41.

A pair of spaced uprights 42 and 43 are joined to the front portion of frame 33 upon opposite ends of the wheel receiving slot 34 and carry at their upper ends the lever arm retaining clips 45 and 44 respectively which are adapted to secure the lever 18 in the angular position shown in Fig. 1, or in the dotted line position also shown in Fig. 1.

In operation it has been found that tilting of the lever 18 to the position shown in Fig. 1 the weight 22 will be elevated and projected forwardly of the axle 15 and that the vertical component of said weight exerts a downward thrust through the hoop 23 and against the corresponding interior surface of the annular surface element 14 of wheel 11—12 to cause a forward rolling movement of said wheel. In order to propel the vehicle forwardly at a steady rate of speed there should be additional and continuous rocking motions of lever 18.

Movement of the lever 18 to the dotted line position shown in Fig. 1 has the effect of causing a rearward rolling movement of the wheel 11—12 upon the surface 41.

Having described my invention reference should now be had to the claims which follow for determining the scope thereof.

I claim:

1. A gravity drive mechanism comprising a hollow wheel having an outer annular coaxial surface, a relatively stationary axle upon which said wheel is journaled, a hoop eccentrically positioned within said wheel and bearing upon the interior of said annular surface, a control arm secured to said axle and having a bifurcated outer end adjacent said hoop, a spherical weight loosely retained within said bifurcation, and a lever secured at one end to said axle exteriorly of said wheel whereby an angular rotary movement of said lever and axle rolls said weight forwardly and upwardly upon said hoop, whereby upon retaining said weight in its elevated position its vertical component is directed toward said annular surface in advance of said axle to cause a forward rolling motion of said wheel.

2. A gravity drive mechanism comprising a hollow wheel having an outer annular coaxial surface, a relatively stationary axle upon which said wheel is journaled, a hoop eccentrically positioned within said wheel and bearing upon the interior of said annular surface, a control arm secured to said axle and having a bifurcated outer end adjacent said hoop, a spherical weight loosely retained within said bifurcation, and a lever secured at one end to said axle exteriorly of said wheel whereby an angular rotary movement of said lever and axle rolls said weight forwardly and upwardly upon said hoop, whereby upon retaining said weight in its elevated position its vertical component is directed toward said annular surface in advance of said axle to cause a forward rolling motion of said wheel, a frame supported on said axle, and a bracket on said frame for securing said lever in angularly adjusted position.

3. A gravity drive mechanism comprising a hollow wheel having an outer annular coaxial surface, a relatively stationary axle upon which said wheel is journaled, a hoop eccentrically positioned within said wheel and bearing upon the interior of said annular surface, a control arm secured to said axle and having a bifurcated outer end adjacent said hoop, a spherical weight loosely retained within said bifurcation, and a lever secured at one end to said axle exteriorly of said wheel whereby an angular clockwise rotary movement of said lever and axle rolls said weight forwardly and upwardly upon said hoop, whereby upon retaining said weight in its elevated position its vertical component is directed toward said annular surface in advance of said axle to cause a forward counter-clockwise rolling motion of said wheel, and a corresponding counter-clockwise adjustment of said lever will effect a clockwise rolling motion of said wheel.

4. A gravity drive mechanism comprising a hollow wheel having an outer annular coaxial surface, a relatively stationary axle upon which said wheel is journaled, a hoop eccentrically positioned within said wheel and bearing upon the interior of said annular surface, a control arm secured to said axle and having a bifurcated outer end adjacent said hoop, a spherical weight loosely retained within said bifurcation, a lever secured at one end to said axle exteriorly of said wheel whereby an angular rotary movement of said lever and axle rolls said weight forwardly and upwardly upon said hoop, whereby upon retaining said weight in its elevated position its vertical component is directed toward said annular surface in advance of said axle to cause a forward rolling motion of said wheel, and rollers journaled within the outer ends of said control arm for cooperative engagement with said weight.

5. A gravity drive mechanism comprising a hollow wheel having an outer annular coaxial surface, a relatively stationary axle upon which said wheel is journaled, a hoop eccentrically positioned within said wheel and bearing upon the interior of said annular surface, a control arm secured to said axle and having a bifurcated outer end adjacent said hoop, a spherical weight loosely retained within said bifurcation, a lever secured at one end to said axle exteriorly of said wheel whereby an angular rotary movement of said lever and axle rolls said weight forwardly and upwardly upon said hoop, whereby upon retaining said weight in its elevated position its vertical component is directed toward said annular surface in advance of said axle to cause a forward rolling motion of said wheel, a forwardly extending lever arm pivotally joined to said control arm at its inner end, and a roller journaled at its outer end for cooperative engagement with said hoop for rolling the same forwardly upon said annular surface advancing the axis of said hoop forwardly of said axle.

6. A gravity drive mechanism comprising a hollow wheel having an outer annular coaxial surface, a relatively stationary axle upon which said wheel is journaled, a hoop eccentrically positioned within said wheel and bearing upon the interior of said annular surface, a control arm secured to said axle and having a bifurcated outer end adjacent said hoop, a spherical weight loosely retained within said bifurcation, a lever secured at one end to said axle exteriorly of said wheel whereby an angular rotary movement of said lever and axle rolls said weight forwardly and upwardly upon said hoop, whereby upon retaining said weight in its elevated position its vertical component is directed toward said annular surface in advance of said axle so cause a forward rolling motion of said wheel, said control arm having an elongated slot transverse of its axis and arranged upon the side of said axle opposite from said weight, and a counter-balancing spherical weight rollably positioned within said slot.

7. In a vehicle having a hollow frame, a supporting roller journaled within said frame at one end, a hollow wheel having an outer annular surface journaled within said frame at its other end, a relatively stationary axle journaled and supported within said frame, said wheel being journaled upon said axle, a hoop eccentrically positioned within said wheel and bearing upon the interior of said annular surface, a control arm secured to said axle and having a bifurcated outer end adjacent said hoop, a spherical weight loosely retained within said bifurcation, a lever secured at one end to said axle exteriorly of said wheel whereby an angular rotary movement of said lever and axle rolls said weight forwardly and upwardly upon said hoop, whereby upon retaining said weight in its elevated position its vertical component is directed toward said annular surface in advance of said axle to cause a forward rolling motion of said wheel, and a bracket on said frame for securing said lever in angularly adjusted position.

GEORGE WIXSON.

No references cited.